United States Patent
Chaney et al.

[15] 3,719,935
[45] Mar. 6, 1973

[54] TELEMETERING SYSTEM FOR ROTATING BODY

[75] Inventors: Preston E. Chaney, Dallas; Charles F. Rhodes, Jr., Richardson, both of Tex.

[73] Assignee: Sun Oil Company, Philadelphia, Pa.

[22] Filed: Oct. 22, 1969

[21] Appl. No.: 868,398

[52] U.S. Cl. ...................................340/206, 340/195
[51] Int. Cl. ..................................................G08c 19/22
[58] Field of Search...........................340/206, 195

[56] References Cited

UNITED STATES PATENTS

| | | | |
|---|---|---|---|
| 3,006,713 | 10/1961 | Klein | 340/206 X |
| 3,261,007 | 7/1966 | Frisch | 340/206 |
| 3,312,107 | 4/1967 | Burns et al. | 340/206 X |
| 3,525,089 | 8/1970 | Bruce | 340/206 |
| 3,530,449 | 9/1970 | Andersen | 340/206 X |
| 3,051,948 | 8/1962 | Faymoreau | 340/206 X |
| 3,394,364 | 7/1968 | Bruce | 340/206 |

*Primary Examiner*—Harold T. Pitts
*Attorney*—George L. Church, Donald R. Johnson, Wilmer E. McCorquodale, Jr. and Frank A. Rechif

[57] ABSTRACT

In order to telemeter data from a moving body to a fixed recorder, a unidirectional voltage representing the data is converted by means of circuitry to frequency modulated pulses which are fed to a transmitting coil which sets up an induction magnetic field; the circuitry and the coil are both mounted on the moving body. A fixed recording system includes a receiver having an antenna located in the induction field of the transmitting coil. The receiver converts the pulses picked up to a unidirectional voltage which provides the input for the recorder.

4 Claims, 3 Drawing Figures

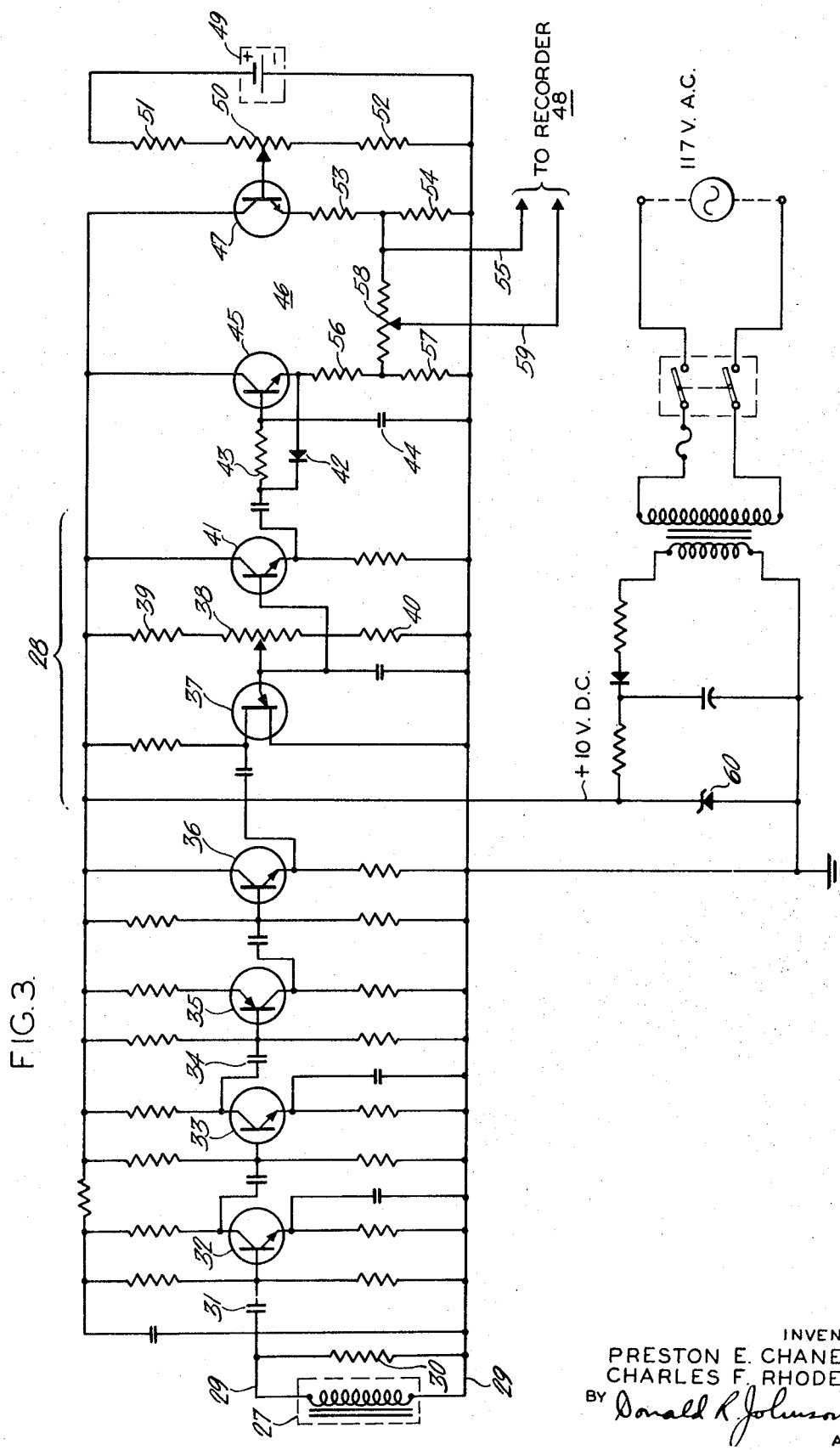

TELEMETERING SYSTEM FOR ROTATING BODY

This invention relates to a telemetering system, and more particularly to a system for transmitting measured data from a moving body to a fixed or stationary utilization apparatus, such as a recorder.

By way of example, the system of this invention may have particular utility for transmitting (for recording) the temperatures existing at several internal locations of a rotating retort, the retort typically being of the type disclosed in the copending Bennett application, Ser. No. 546,225, filed Apr. 29, 1966, which ripened on Dec. 2, 1969, into U.S. Pat. No. 3,481,720. Such a retort is cylindrical in shape, approximately 32 inches in diameter and about 20 feet long; when in use, it is rotated about its longitudinal axis, which is disposed horizontally.

For measuring the various temperatures (which may range from 75°F. to approximately 1,500°F.), thermocouples are conventionally used, these being mounted on the rotating retort and rotating therewith. The problem is in coupling the (unidirectional) voltages from the rotating thermocouples to the fixed or stationary recording system. The use of simple brush (sliding) contacts for this purpose has been found to be impractical, because of excessive noise and the need for frequent maintenance of the contacts.

An object of this invention is to provide a novel telemetering system.

Another object is to provide a system for transmitting measured data from a moving body to a fixed recording means, which system does not involve the use of sliding contacts.

A further object is to provide an efficient and effective telemetering system for use between a moving body and a fixed recording means.

A still further object is to provide a novel arrangement for coupling electrical signals from a moving body to a stationary signal receiver.

The objects of this invention are accomplished, briefly, in the following manner: The voltage output of a thermocouple mounted on the rotating retort is converted, by circuitry also mounted on the retort, to a series of voltage pulses whose repetition rate is proportional to the magnitude of such output, and these pulses are applied to a transmitting coil, also mounted on the retort, which sets up an induction magnetic field. A stationary receiving means, having an antenna in the induction field, converts the pulses picked up by the antenna to a unidirectional voltage whose magnitude is proportional to the pulse repetition rate; this latter voltage is fed to a recorder.

A detailed description of the invention follows, taken in conjunction with the accompanying drawings, wherein:

FIG. 3 is a circuit diagram of a stationary or fixed receiver.

Figure 1:
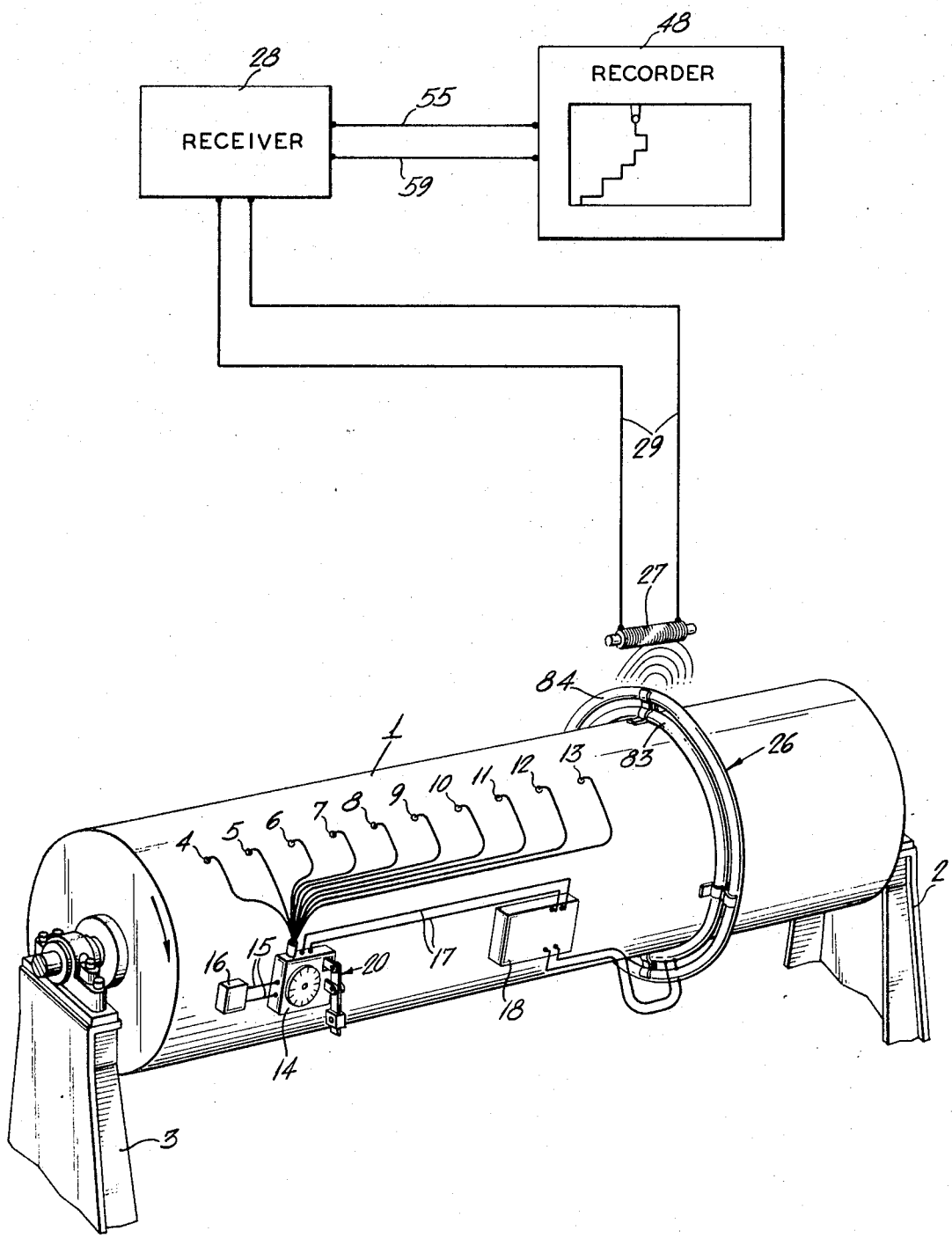
FIG. 1 is a schematic representation of a telemetering system according to this invention.

Referring first to FIG. 1, the retort 1 is of generally cylindrical configuration and is mounted for rotation about its longitudinal (horizontal) axis by means of a pair of bearing-type supports schematically illustrated at 2 and 3. Reference may be made to the aforementioned application for a more complete disclosure of a retort mounting and a retort driving (rotating) arrangement.

A group of ten thermocouples, denoted by reference numerals 4 through 13, are mounted on the rotating body 1, each thermocouple being operatively coupled to a respective internal location (inside the retort) at which the temperature is desired to be measured. These thermocouples are individually and separately connected to a switching unit 14 mounted on the outside of the rotating retort or barrel 1, there being two electrical leads extending from each thermocouple to unit 14. The switching unit 14 has multiple input connections which include the 20 thermocouple leads previously mentioned and which also include a pair of electrical leads 15 extending from a stable calibration voltage source 16 mounted on the moving body 1. The switching unit 14 has a single output connection comprising a pair of electrical leads 17 which provide an input signal to a transmitter 18 (to be further described hereinafter, in connection with FIG. 2) also mounted on the rotating retort 1.

Figure 2:
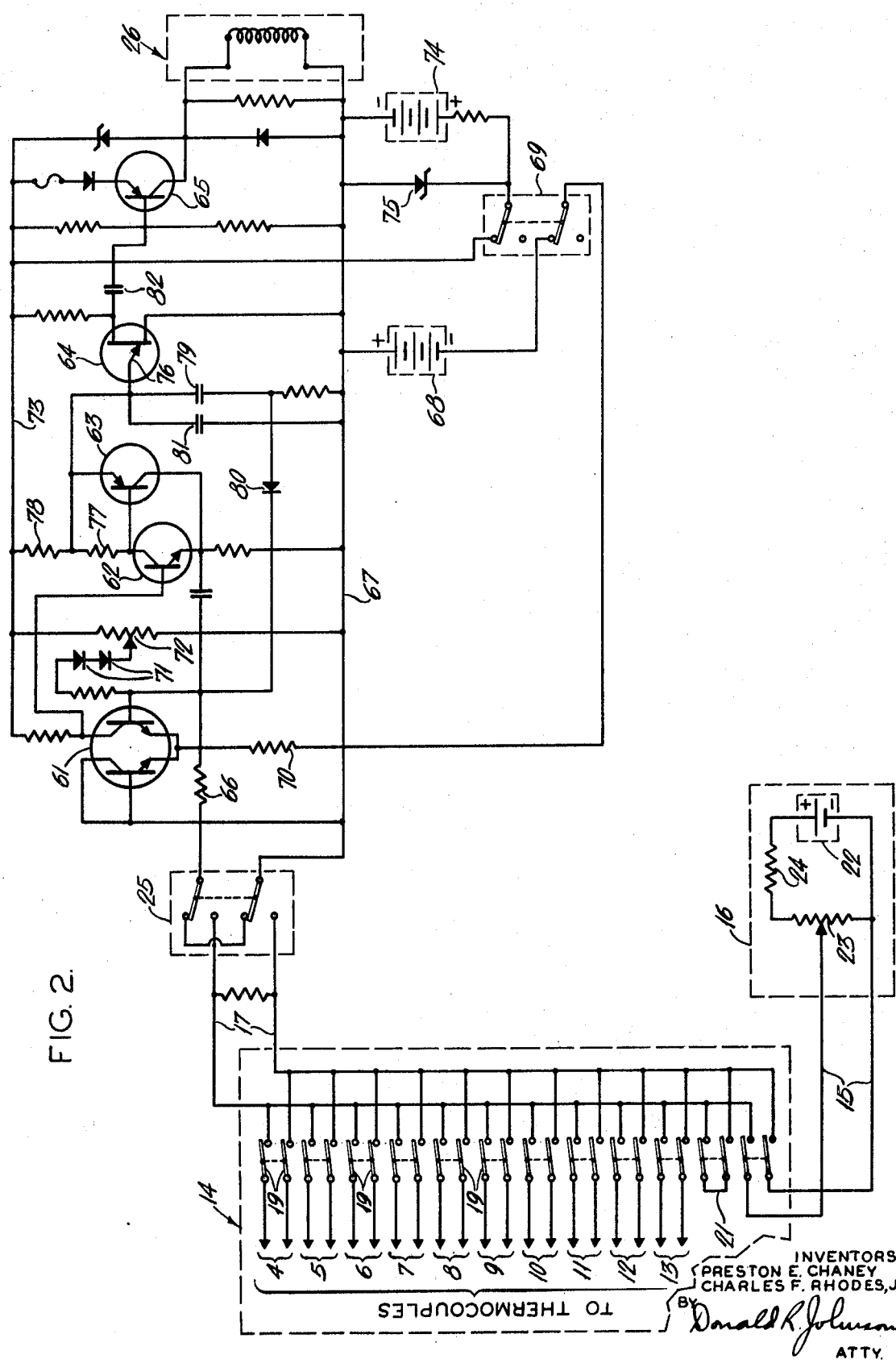
FIG. 2 is a circuit and schematic diagram of the retort-mounted transmitter and adjuncts thereto.

The switching unit 14 is a magnet-operated magnetic reed switch system, comprising twelve pairs of magnetic reed switches 19 (see FIG. 2) mounted around the outside periphery of a plate 8½ inches in diameter. The switch pairs are spaced at 30° intervals around the plate, such that a rotating magnet (not shown, but pivotally mounted at the center of the plate) will close both reed switches of a pair simultaneously, causing the pair to act as a double-pole single-throw switch; hence, the switches 19 are illustrated in FIG. 2 as being mechanically coupled together in pairs. By means of a weight and ratchet mechanism 20, the magnet is caused to advance 30° for each rotation of the retort 1. As shown in FIG. 2, 10 of the switch pairs are connected to the thermocouples 4–13, one pair to each thermocouple.

The 24 fixed contacts of reed switches 19 are connected to the two transmitter input leads 17, one contact of each pair being connected to one of the leads 17 and the other contact of each pair being connected to the other one of the leads 17. Thus, the unidirectional voltages developed by the thermocouples 4–13 are switched sequentially (by the switching unit 14) to the input of the transmitter 18, one such voltage being applied to the transmitter input during each revolution of the retort.

The 11th pair of reed switches 19 are connected together as at 21, so that when this pair of switches closes, the transmitter input is short-circuited (i.e., has zero voltage applied thereto).

The 12th pair of reed switches 19 are connected to the leads 15 which extend from the calibration voltage source 16. The fixed, stable calibration voltage source includes a mercury battery 22 across which is connected a potentiometer 23, in series with a fixed resistor 24. One of the leads 15 is connected to the movable arm of potentiometer 23, and the other of these leads is connected to the zero-potential (negative) end of the potentiometer. The movable arm of potentiometer 23 is adjusted to provide thereat a positive unidirectional voltage of 21.3 millivolts.

The eleventh and twelfth pairs of switches 19 are used for calibrating the receiver/recorder of the telemetering system. Closure of the eleventh pair of switches 19 short-circuits the transmitter input, while closure of the twelfth pair connects the transmitter to a 21.3-millivolt d.c. source. The short-circuiting position enables the operator to zero the recorder, while the 21.3-millivolt position allows the recorder to be calibrated at 1,000°F. This calibrating arrangement enables the calibration to be checked every 12 revolutions of the retort, and adjustments can be made without stopping the retort.

FIG. 2 is a schematic diagram of the transmitter, and adjuncts thereto. As previously brought out, all of the circuitry of FIG. 2, plus the thermocouples, is mounted on the rotating body 1 and rotates therewith. The leads 17 are connected to respective terminals of a double-pole double-throw switch 25 which in one of its positions or "throws" connects these leads to the input of transmitter 18, and in the other of its positions (illustrated) provides a short-circuit across the input of the transmitter. The transmitter 18 is 100 percent solid-state.

Speaking generally, the transmitter 18 consists of a voltage-to-frequency converter utilizing transistors 61, 62, and 63 and unijunction 64, and a power output stage utilizing transistor 65. Again speaking generally, the voltage-to-frequency converter produces a pulse output whose frequency (i.e., repetition rate) is proportional to the d.c. or unidirectional input voltage to this converter (appearing across leads 17).

One of the input leads 17 for the transmitter is connected through a resistor 66 to the right-hand base of the twin transistor 61 which is essentially a differential amplifier, the other input lead 17 being connected to a common bus 67 which may be considered as reference or "ground"; this of course assumes that switch 25 has been placed in its lower or "on" position. The diode-connected left-hand half of transistor 61 provides a stable reference voltage for the emitters of transistor 61, this negative voltage being obtained from a battery 68 in the power supply (when the "power" switch 69 is in its upper "on" position, illustrated) through a resistor 70. This arrangement allows amplification of input voltages from zero volts d.c. up.

The base voltage for the right-hand half of transistor 61 is obtained by way of a pair of silicon diodes 71 (used for temperature stability) from a potentiometer 72 connected between the positive bus 73 and the ground bus 67. A battery 74 in the power supply supplies a regulated voltage of 20 volts d.c. (regulated by Zener diode 75) to bus 73. With the input to the transmitter shorted (switch 25 in its upper or "short" position, illustrated), the transmitter output is set at the audio repetition rate of 250 pulses per second, by adjusting potentiometer 72. With the 21.3-millivolt d.c. calibration source 16 connected to the transmitter input, the transmitter output is at the audio repetition rate of 1,150 pulses per second.

The transistors 61, 62, and 63 form an operational amplifier, with a high overall gain at the emitter 76 of the unijunction 64.

The amplified d.c. voltage is taken from the collector of the right-hand half of transistor 61 and fed to the base of transistor 62. The transistors 62 and 63 comprise a d.c. charging circuit for the emitter 76 of unijunction 64. Transistor 62 is connected to operate as a d.c. amplifier, with a split load resistor (resistors 77 and 78, connected in series) in its collector circuit. Transistor 63 functions as an emitter follower to provide a low output impedance, its base being connected to the collector of transistor 62 and its emitter being connected to the junction point of resistors 77 and 78. Since the emitter of transistor 63 follows the d.c. potential of the collector of transistor 62, resistor 77 in the collector circuit of the latter acts like a large impedance. This increases the input impedance of transistor 62, and also improves the gain and linearity.

The unijunction 64 functions as a pulse oscillator whose frequency of oscillation (i.e., the repetition rate of whose pulses) is determined by the input d.c. charging rate to the emitter 76, this input charging rate being in turn a linear function of the d.c. input voltage (transmitter input voltage) to transistor 61. Overall negative feedback to the input of the operational amplifier, through a capacitor 79 and a diode 80, is used to achieve a high degree of linearity and stability. The capacitor 79, as well as another capacitor 81 connected between emitter 76 and neutral bus 67, are mica capacitors, for temperature stability in the pulse timing circuit.

The unijunction pulse oscillator 64 produces output pulses whose amplitude and duration (and therefore whose pulse shape) are constant. The duration of these pulses is 5 microseconds, with a rise time of 2 microseconds. These pulses are frequency modulated, in that their (audio) repetition rate is proportional to the input voltage to the operational amplifier, and thus proportional to the voltage supplied through whichever one of the switches 19 is closed at the time. As previously described, the unidirectional voltage supplied to the operational amplifier in transmitter 18, at any particular time, may be a temperature-representative voltage developed by one of the thermocouples 4–13, or it may be zero voltage (when the short-circuit 21 is applied to leads 17), or it may be the fixed calibration voltage supplied by source 16. Whichever it is, the repetition rate of the pulses produced at any time by oscillator 64 is proportional to the d.c. voltage coupled to the transmitter 18 input at that same time.

The power output stage of the transmitter, transistor 65, is triggered by the pulses generated by the unijunction oscillator 64. The transistor 65 serves as a pulse power amplifier, and the pulses to be amplified are supplied from unijunction 64 to the base of transistor 65 by way of a capacitor 82. The amplified pulses are taken off from the collector of transistor 65 and applied to the transmitting coil arrangement 26. This latter arrangement (see FIG. 1) comprises a pair of coils 83 and 84 which encircle the retort 1 and rotate therewith. The coil 83 may consist of a plurality of turns of copper wire arranged in a coil 35 inches in diameter, and coil 84 may consist of a plurality of turns of copper wire arranged in a coil 43 inches in diameter; the coil 84 is mounted above coil 83, and the two coils are connected in series in the output circuit of transistor 65. The transmitting coil arrangement 26 is constructed and arranged to set up an induction magnetic field. The output pulses supplied to the coil arrangement 26 may be a constant 18 volts in amplitude, with a duration of 5 microseconds and a rise time of 2 microseconds. It has been found that the radio frequency content of these fast-rising pulses makes for extremely good propagation characteristics.

The output stage 65 of the transmitter is designed such that it will draw current only for the duration of each pulse. Therefore, average current drain is low, although peak current is high. Average battery life is approximately 50 hours. For long-term use, a power supply using secondary cells, with a charging circuit supplied through brush contacts on the retort, could be used, since noise on the contacts would be eliminated by the Zener voltage regulator 75.

As previously described, the voltage pulse output of the transmitter is fed to the transmitting coil arrangement 26, which is mounted on the retort 1 and rotates therewith. As schematically shown in FIG. 1, a fixed or stationary (which means non-rotating) receiving antenna 27 is placed near the transmitting coil, so as to be located in the induction magnetic field of the coil arrangement 26. This antenna may comprise several thousand turns of magnet wire wound on a ferrite rod, and is polarized to feed positive pulses into a receiver 28. The pulses picked up by the antenna 27 are coupled to the input of the stationary receiver 28 by way of a pair of leads 29.

Refer now to FIG. 3, which is a circuit diagram of the receiver 28. This receiver is 100 percent solid-state. An attenuating resistor 30 is connected between the leads 29, and thus across the antenna 27; this resistor is adjusted to provide pulses of approximately 50 millivolts amplitude across the receiver antenna. The received or picked-up positive pulses are fed through a capacitor 31 to the base of a transistor 32 which provides the first stage of a cascaded two-stage pulse amplifier the second stage of which comprises a transistor 33.

From the collector of transistor 33, the amplified pulses are fed through a capacitor 34 to the base of a transistor 35 operating as a limiter, which limits the amplified pulses, thereby to obtain pulses of a constant height and width. A transistor 36 operating as an emitter follower couples the limited pulses to a unijunction 37 connected to operate as a pulse shaper. This pulse shaper actually comprises a unijunction oscillator whose emitter voltage is set just below the firing point by means of a potentiometer 38 which is connected (in series with two fixed resistors 39 and 40) across the power supply. The negative-going pulse from the emitter follower 36 triggers the base No. 2 circuit of device 37, causing this unijunction to pulse.

The unijunction oscillator pulse, which is of constant amplitude and duration, is fed through a transistor emitter follower 41 to a rectifying and averaging circuit (including a diode rectifier 42 and a resistor-capacitor combination 43, 44), which provides an output d.c. voltage proportional to the input pulse repetition rate. (It will be recalled that the repetition rate of the pulses transmitted by the transmitter is made to be proportional to the magnitude or value of the data bit to be transmitted from the rotating retort.)

The unidirectional output voltage of the averaging circuit is coupled through a transistor emitter follower 45 to a balancing-type or bridge-type driving circuit 46 for a 2.5-millivolt recorder 48 (see FIG. 1). The circuit 46 also includes a transistor emitter follower 47 of the same type as transistor 45, the base of transistor 47 being supplied with a stable but adjustable reference voltage obtained from a mercury battery 49 across which is connected a potentiometer 50 in series with two fixed resistors 51 and 52; the movable arm of potentiometer 50 is connected to the base of transistor 47 and provides a zero control or "zero adjust" for the recorder 48. Two resistors 53 and 54 are connected in series between the emitter of transistor 47 and "-ground" or the negative side of the power supply, and from the common junction of resistors 53 and 54 a lead 55 extends to the recorder 48. A pair of similar resistors 56 and 57 are connected in series between the emitter of transistor 45 and "ground," resistor 56 being equal in value to resistor 53 and resistor 57 being equal in value to resistor 54. The two ends of a potentiometer 58 are connected one to the junction of resistors 56 and 57 and the other to the junction of resistors 53 and 54, and the movable arm of potentiometer 58 is connected to the other lead 59 for the recorder 48. The movable arm of potentiometer 58 serves as a range control or "range adjust" for the recorder 48.

The moving chart of the recorder 48 (see FIG. 1) is calibrated in terms of temperature, in degrees F., since the various individual d.c. driving voltages fed to the recorder are (by means of the telemetering system described) made to be proportional to the d.c. voltages developed by the various individual thermocouples 4-13.

The receiver of FIG. 3 is powered by a line-operated power supply (shown in the lower part of this figure) whose d.c. output voltage is regulated by a Zener diode 60.

A telemetering system according to this invention has been built and successfully tested. The accuracy was found to be very good, and zero drift due to temperature change was less than 3 percent. Range drift was less than 1 percent.

The system of this invention could be used, for telemetering of data from a moving body, in any case where the data to be telemetered could be converted to a d.c. voltage.

The invention claimed is:

1. In a telemetering system for transmitting measured data from a moving body to stationary utilization apparatus for such data: means responsive to a physical characteristic being measured to develop a unidirectional variable-magnitude voltage whose magnitude is proportional to the value of such characteristic, means receptive of such voltage for producing a series of voltage pulses of constant polarity, amplitude and duration and whose repetition rate is proportional to the magnitude of such voltage, a transmitting coil for setting up an induction magnetic field, and means for feeding said produced pulses to said coil; all of said means and said coil being mounted on said body and moving therewith.

2. Combination according to claim 1, wherein the first-named means includes a plurality of sensing devices each responsive to a respective physical characteristic being measured; and wherein the second-named means includes circuit means for producing a series of voltage pulses whose repetition rate is proportional to the magnitude of a unidirectional voltage coupled to the input of such circuit means, and means for separately and sequentially coupling the variable-magnitude unidirectional voltages developed by said sensing devices to the input of said circuit means.

3. Combination recited in claim 2, wherein said sensing devices are thermocouples for measuring temperatures associated with said body.

4. Combination of claim 2, including also a d.c. calibrating voltage source mounted on said body, and means for periodically coupling the calibrating voltage to the input of said circuit means.

* * * * *